US012205503B2

(12) United States Patent
Lee et al.

(10) Patent No.: US 12,205,503 B2
(45) Date of Patent: Jan. 21, 2025

(54) SOURCE DRIVER AND METHOD OF DETECTING CRACK OF DISPLAY PANEL

(71) Applicant: LX SEMICON CO., LTD., Daejeon (KR)

(72) Inventors: Byeon Cheol Lee, Daejeon (KR); Seong Geon Kim, Daejeon (KR); Won Kim, Daejeon (KR); Tai Ming Piao, Daejeon (KR); Young Ho Shin, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/480,899

(22) Filed: Oct. 4, 2023

(65) Prior Publication Data

US 2024/0119874 A1 Apr. 11, 2024

(30) Foreign Application Priority Data

Oct. 5, 2022 (KR) ........................ 10-2022-0127318
Sep. 26, 2023 (KR) ........................ 10-2023-0129612

(51) Int. Cl.
*G09G 3/00* (2006.01)

(52) U.S. Cl.
CPC ..... *G09G 3/006* (2013.01); *G09G 2300/0426* (2013.01); *G09G 2310/08* (2013.01); *G09G 2330/12* (2013.01)

(58) Field of Classification Search
CPC ........... G09G 3/006; G09G 2300/0426; G09G 2310/08; G09G 2330/12; G09G 3/3291
See application file for complete search history.

(56) References Cited

U.S. PATENT DOCUMENTS

2016/0225312 A1* 8/2016 Byun ..................... G09G 3/006
2016/0260367 A1* 9/2016 Kwak .................... G09G 3/006
2018/0053466 A1 2/2018 Zhang et al.
2021/0248938 A1* 8/2021 Lee .......................... G09G 3/20
2023/0245605 A1* 8/2023 Oh ......................... G09G 3/006
345/694

FOREIGN PATENT DOCUMENTS

EP 3806076 A1 4/2021

OTHER PUBLICATIONS

Extended European Search Report issued on Jan. 4, 2024 for European Application No. 23201882.0, 10 pages.

* cited by examiner

*Primary Examiner* — Premal R Patel
(74) *Attorney, Agent, or Firm* — ROTHWELL, FIGG, ERNST & MANBECK, P.C.

(57) ABSTRACT

Disclosed are a source driver and a method of detecting crack of a display panel. A source driver may comprise a first circuit configured to apply first data to data lines connected to sub-pixels of a display panel to charge a first driving voltage; and a second circuit formed on the display panel that applies the first driving voltage to a detection line formed on the display panel to detect the presence of cracks in the display panel based on the illumination status of the sub-pixels, wherein the detection line includes a first detection node and a second detection node formed on one side of the display panel along its extension direction, wherein the first detection node is connected to data lines of the first and third sub-pixels, and wherein the second detection node is connected to data line of the second sub-pixel.

20 Claims, 11 Drawing Sheets

SOURCE DRIVER AND METHOD OF DETECTING CRACK OF DISPLAY PANEL

CROSS-REFERENCE TO RELATED APPLICATIONS

The present application claims priority to and the benefit of priority to Korean Patent Application No. 10-2022-0127318, filed on Oct. 5, 2022 and Korean Patent Application No. 10-2023-0129612, filed on Sep. 26, 2023, which are incorporated herein by reference in their entirety.

TECHNICAL FIELD

The present disclosure relates to a display device and a method for detecting or determining cracks in a display panel.

BACKGROUND

The display market is expanding from large home appliances such as traditional TVs to the mobile market and even various home appliances.

Display devices equipped with such displays may have defects, and defects, i.e., cracks in the display panel, are usually checked before shipping the product.

As a result of confirmation, display devices equipped with cracked display panels should not be shipped as defective.

This is because, when a crack occurs on the display panel, foreign substances such as moisture may penetrate into the cracked area, and the foreign substances that penetrate in this way cause defects in the display panel.

Therefore, since defective display devices should not be shipped, technology for accurately measuring and determining cracks in the display panel is required.

A display crack detection method was designed in response to these needs, but because the manager had to perform the test procedure each time, it was not intuitive and there was a possibility of error in the detection.

DISCLOSURE OF THE INVENTION

Technical Problem

The technical problem of the present disclosure is to provide a display device including a panel crack detection circuit that may intuitively detect whether a crack has occurred in the display panel and a method for measuring display panel cracks.

Technical Solution

A source driver may comprise a first circuit configured to apply first data to data lines connected to sub-pixels of a display panel to charge a first driving voltage; and a second circuit formed on the display panel that applies the first driving voltage to a detection line formed on the display panel to detect the presence of cracks in the display panel based on the illumination status of the sub-pixels, wherein the detection line includes a first detection node and a second detection node formed on one side of the display panel along its extension direction, wherein the first detection node is connected to data lines of the first and third sub-pixels, and wherein the second detection node is connected to data line of the second sub-pixel.

A method of measuring panel cracks in a display device may comprise applying first data to data lines connected with sub-pixels of a display panel to charge a first driving voltage; and applying the first driving voltage to a detection line formed in the display panel to detect cracks in the display panel based on the illumination status of the sub-pixels, wherein the detection line includes a first detection node and a second detection node formed on one side of the display panel, wherein the first detection node is connected to data lines of the first and third sub-pixels, and wherein the second detection node is connected to data lines of the second sub-pixel.

Effect of the Invention

According to at least one of the various embodiments of the present disclosure, it is possible to intuitively detect whether a crack has occurred in the display panel.

DETAILED DESCRIPTION OF THE INVENTION

A display device according to various embodiments of the present disclosure will be described in detail.

Figure 1:
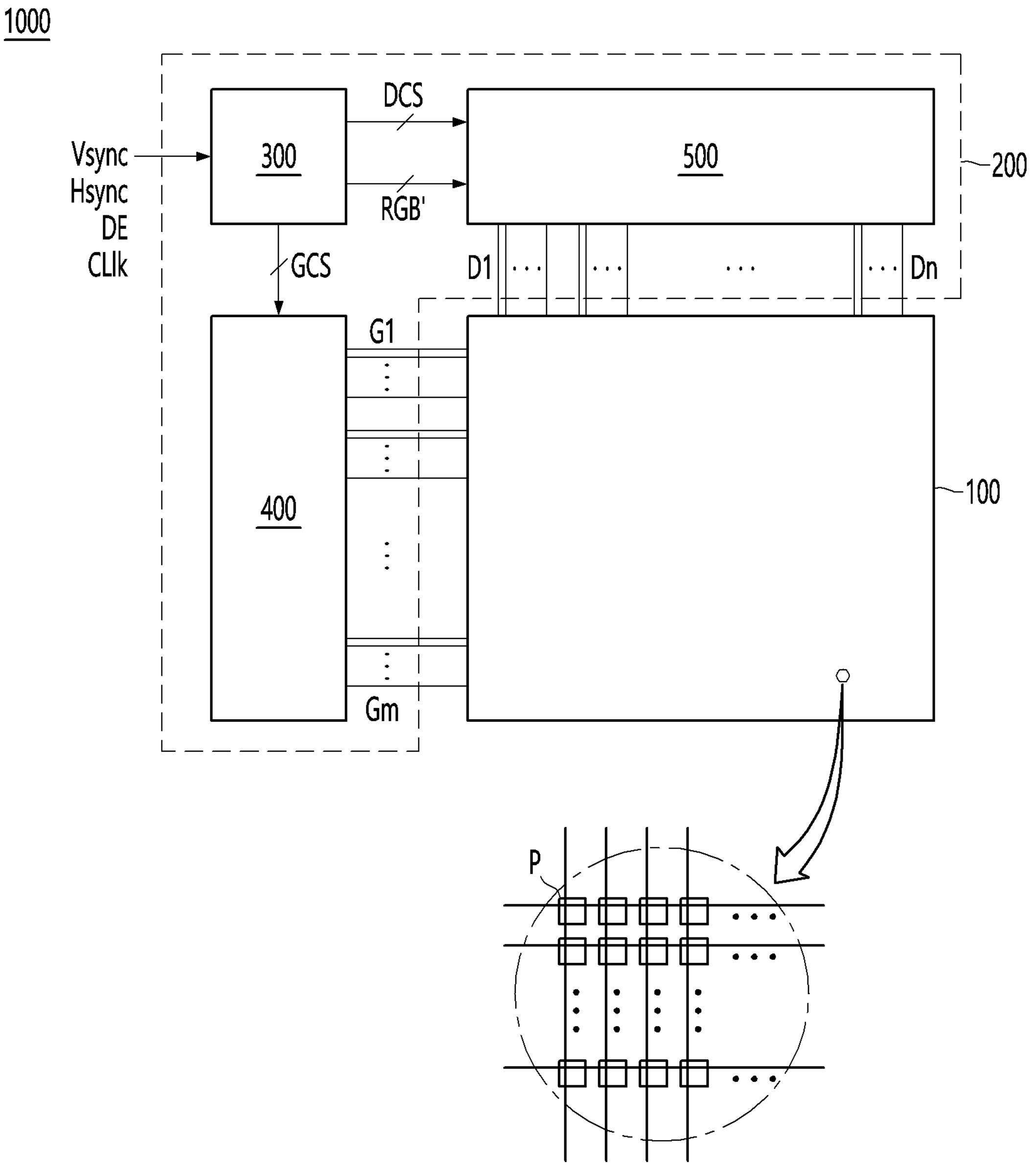
FIG. 1 is a block diagram of a display device according to at least one among various embodiments of the present disclosure.

FIG. 1 is a block diagram of a display device according to at least one among various embodiments of the present disclosure.

Figure 2:
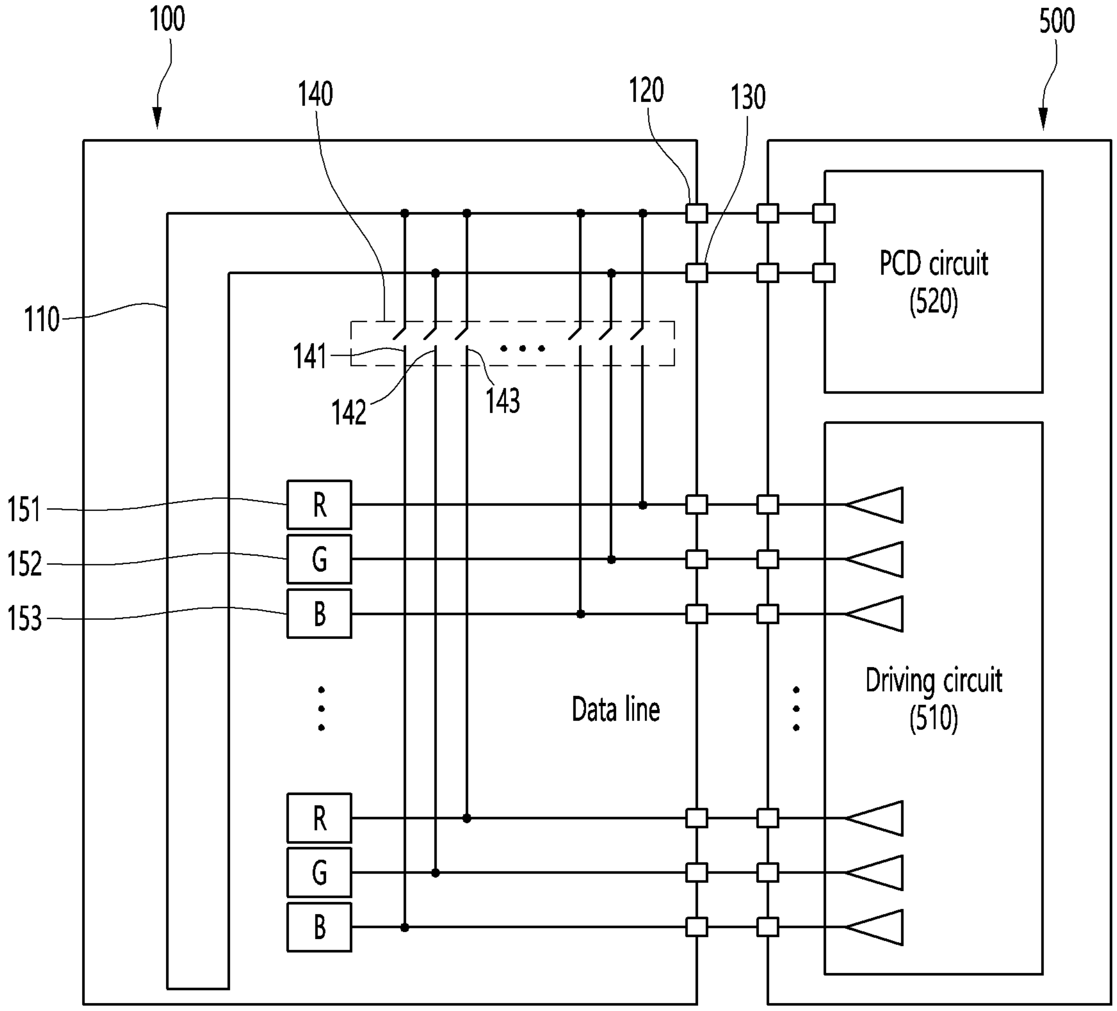
FIG. 2 is a diagram illustrating the connection relationship between a display panel and a crack detection circuit according to at least one among various embodiments of the present disclosure.

FIG. 2 is a diagram illustrating the connection relationship between a display panel and a crack detection circuit according to at least one among various embodiments of the present disclosure.

Referring to FIG. 1, a display device 1000 according to an embodiment of the present disclosure includes a display panel 100 and a display driving device 200.

The display device 1000 may accommodate various types of display panels and is not limited to at least one thin film transistor (TFT) and an organic light-emitting diode (OLED).

The display device 1000 may be implemented with other displays, including but not limited to liquid crystal displays, field emission displays, electroluminescent displays, and electrophoretic displays, in addition to organic light-emitting displays.

A plurality of pixels (P) may be arranged in the display panel 100, and data lines and gate lines connected to the plurality of pixels (P) may be arranged as well.

The display driving device 200 may supply data signals to the plurality of pixels (P) to display an image through the display panel 100.

The display driving device 200 may comprise a timing controller 300, a gate driving device 400, a data driving device 500, and the like.

The timing controller 300 may receive various timing signals, including vertical synchronization signal (Vsync), horizontal synchronization signal (Hsync), data enable (DE) signal, clock signal (CLK), and the like, from an external system (not shown).

The timing controller 300 may generate signals such as a gate control signal (GCS) for controlling the gate driving device 400 and a data control signal (DCS) for controlling the data driving device 500.

Furthermore, the timing controller 300 may receive an image signal (RGB) from a system, perform conversion to create an image signal (RGB') in a format that may be processed by the data driving device 500, and subsequently control the image signal (RGB') to be output.

The host system may convert digital image data into a format suitable for displaying on the display panel 100. The host system may also transmit timing signals along with the digital image data to the timing controller 300. The host system may be implemented as one of the following: a television system, a set-top box, a navigation system, a DVD player, a Blu-ray player, a personal computer (PC), a home theater system, or a phone system, and receive an input video signal.

The gate driving device 400 may receive the gate control signal (GCS) from the timing controller 300. Subsequently, the gate driving device 400 may generate gate pulses (or scan pulses) synchronized with the data signal based on the received gate control signal (GCS) and shift the generated gate pulses to be sequentially supplied to the gate lines (G1 to Gm).

The data driving device 500 may receive both the data control signal (DCS) and the image signal (RGB') from the timing controller 300.

The gate driving device 400 may establish connections between each pixel (P) and the data line by transmitting a scan signal (SS) to the gate line. The data driving device 500 may drive each pixel (P) by supplying a data voltage (Vdata) corresponding to the image data to the data line.

The timing controller 300 may transmit the gate control signal (GCS) to the gate driving device 400 and the data control signal (DCS) to the data driving device 500 to control the driving timing for each pixel (P). In this context, the gate driving device 400 may be alternatively referred to as a gate driver IC (GDIC), while the data driving device 500 may be also referred as a source driver IC (SDIC).

Referring to FIG. 2, the source driver IC 500 may comprise a driving circuit 510 and a PCD circuit 520.

In FIG. 2, for the sake of convenience, only one source driver IC 500 is depicted, but this is not limiting.

The driving circuit 510 converts the received image signal (RGB') into an analog data signal and supplies the converted analog data signal to pixels (P), which are sub-pixels, through a plurality of data lines (D1 to Dn).

The PCD circuit 520 is capable of assessing the presence of cracks in the display panel 100.

The PCD circuit 520 may be connected to detection nodes (or PCD nodes) 120, 130 formed on the display panel 100.

To assess whether the display panel 100 has cracks, pre-designed detection lines 110 are positioned on the display panel 100, and at one end, multiple detection nodes 120, 130 connected to the detection line 110 are formed.

The detection line may create a closed circuit between the first detection node (or PCD1 node) 120 and the second detection node (or PCD2 node) 130.

In this case, a detection line resistance ($R_{pcd\_line}$) may be formed between the first detection node 120 and the second detection node 130, which is on the detection line 110.

Meanwhile, the detection line extending from the first detection node 120 may be connected to the data lines of the first and third sub-pixels among the sub-pixels of each pixel.

Furthermore, the detection line extending from the second detection node 130 may be connected to the data line of the second sub-pixel among the sub-pixels of each pixel.

In this scenario, a switch is established between the detection nodes and the data line of each sub-pixel. So, the detection nodes are connected or disconnected with data line of each sub-pixel by switching the switch to be on or off.

The PCD circuit 520 may provide predetermined data through the first detection node 120 formed on the display panel 100 and subsequently supply the predetermined data again through the second detection node 130. This process allows for the detection or determination of the presence of cracks on the display panel 100. In this context, cracks on the display panel may be determined, for example, by whether at least one pixel (P) located on the display panel 100 emits light. Furthermore, the predetermined data may include black data, but it is not limited to that.

Figure 3:
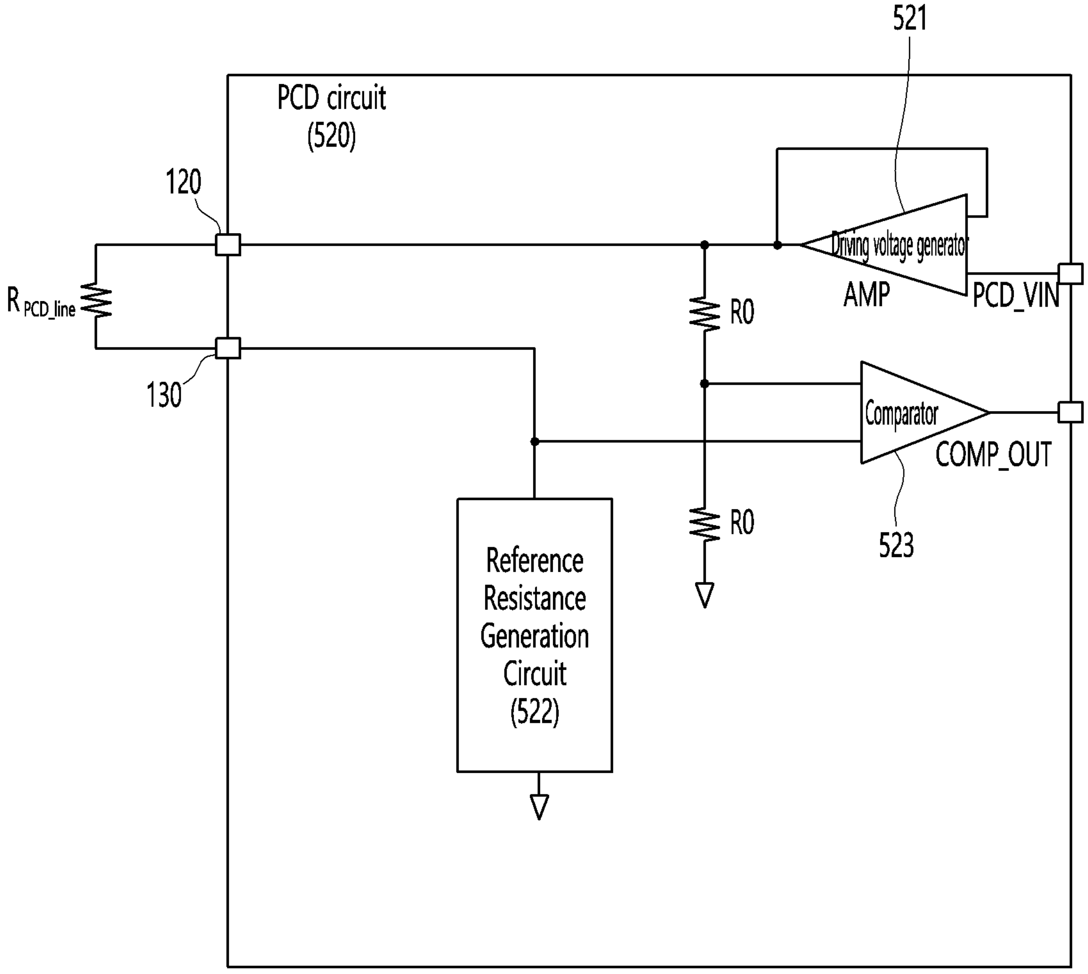
FIG. 3 illustrates the detailed configuration of the PCD circuit 520.

FIG. 3 illustrates the detailed configuration of the PCD circuit 520.

Figure 4:
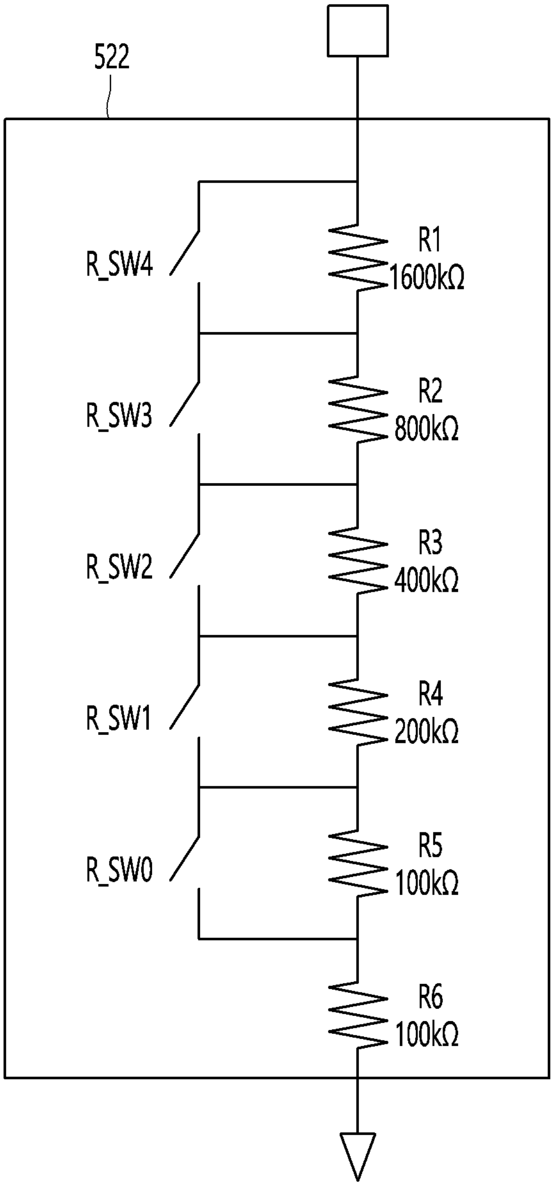
FIG. 4 illustrates the detailed configuration of the reference resistance generation circuit.

FIG. 4 illustrates the detailed configuration of the reference resistance generation circuit.

Referring to FIG. 3, the PCD circuit 520 may comprise a driving voltage generator (e.g., PCD AMP) 521, a reference resistance generation circuit 522, and a comparator 523.

The driving voltage generator 521 may receive the VIN value (PCD_VIN) and apply a predetermined voltage value which may correspond to black data to the first detection node 120. Furthermore, the voltage value corresponding to the predetermined data (i.e., black data) may not be the same as the VDD value, and this may be referred to as the driving voltage.

Referring to FIGS. 3 and 4, the reference resistance generation circuit 522 may consist of multiple resistors and switches, enabling control over the voltage drop across the resistance ($R_{pcd\_line}$) formed on the detection line, specifically between the first detection node 120 and the second detection node 130.

Referring to FIG. 4, six resistors (R1-R6) connected in series may be included in the reference resistance generation circuit 522, for example.

In this configuration, each resistor may have a total of five switches (R_SW0 to R_SW4) formed at both ends.

In FIG. 4, R1 may have a resistance of 1600 kΩ, R2 may have a resistance of 800 kΩ, R3 may have a resistance of 400 kΩ, R4 may have a resistance of 200 kΩ, R5 may have a resistance of 100 kΩ, and R6 may have a resistance of 100 kΩ.

In FIG. 4, R1 is configured with the highest resistance, while R5 or R6 has the lowest resistance. However, this configuration is not limited to this, and it may be the opposite. In other words, R1 may have the lowest resistance value, while R5 or R6 may have the highest resistance value.

In FIG. 4, the resistance values of R1 to R5 may have a multiple relationship (e.g., ½) and may decrease sequentially. However, it is noted that the present disclosure is not limited to this configuration and may not necessarily have a multiple relationship.

Additionally, in FIG. 4, R1 to R5 may be configured to have gradually smaller resistance values, but this configuration is not necessarily limited.

Meanwhile, while FIG. 4 illustrates that R5 and R6 may be configured with the same resistance value, the present disclosure is not limited to this configuration.

For example, R6 may have a smaller or larger resistance value than R5.

Referring to FIG. 4, switches formed at both ends of the resistor may be controlled (on or off) to arbitrarily determine the resistance value generated in the reference resistance generation circuit 522.

In this context, the resistance value determined in the reference resistance generation circuit 522 may be determined to be greater than, for example, the resistance value ($R_{pcd\_line}$) formed on the detection line 110.

This is intended to control the voltage drop within a normal range when no cracks occur on the display panel 100 in the detection line 110. Here, within the normal range of voltage drop may be illustrated, for example, by the extent or range of voltage drop occurring in the data line of the second sub-pixel (G) in (b) of FIG. 7.

In other words, if no cracks occur on the display panel 100, the voltage drop in the data line of the second sub-pixel (G) may be indicative of the level of voltage drop that prevents the corresponding sub-pixel from emitting light.

Figure 7:
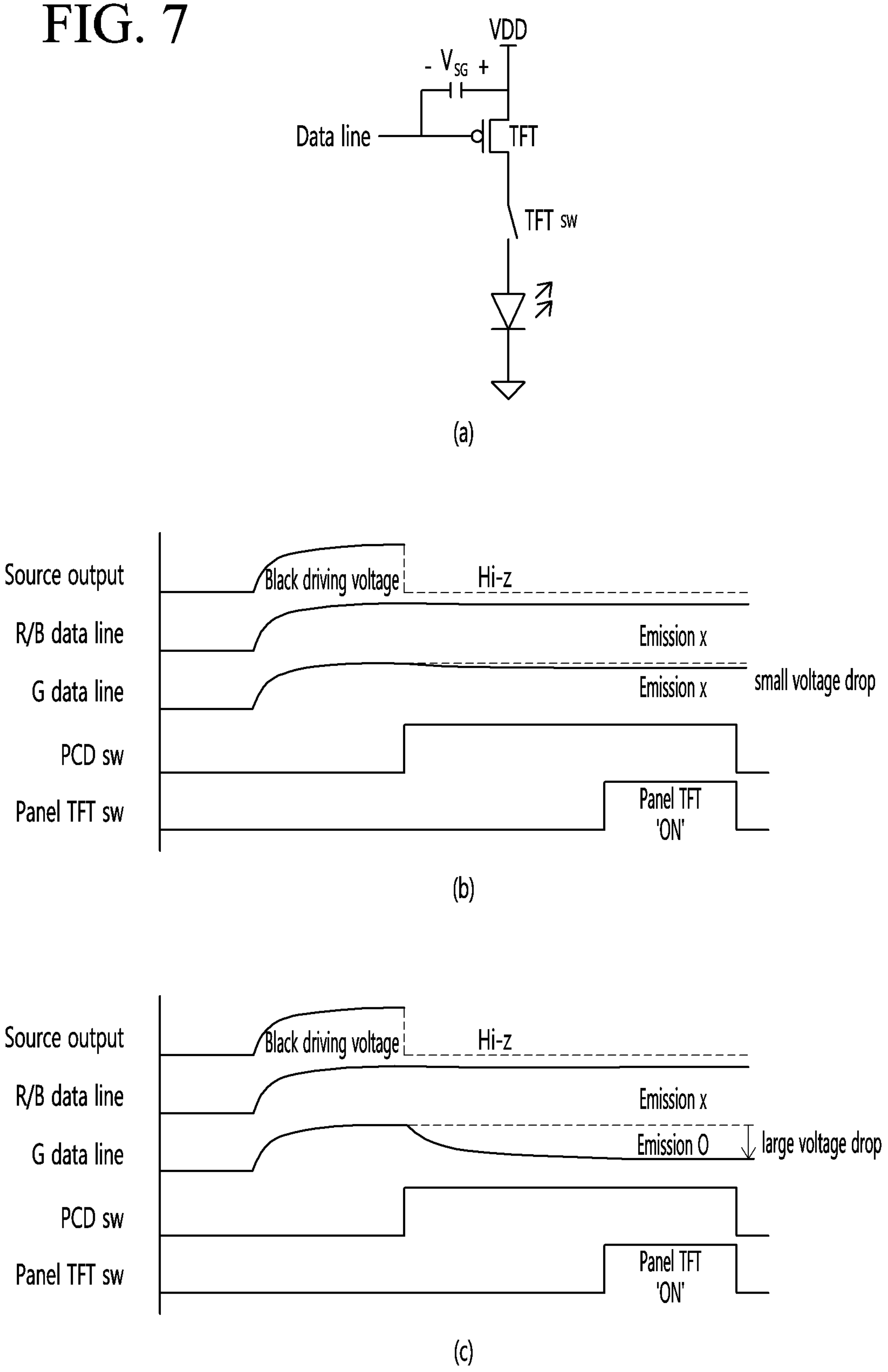
FIG. 7 illustrates an operation of the display panel 100 in the event of a crack occurring.

In contrast, as shown in (c) of FIG. 7, relative to the degree of voltage drop occurring in the data line of the second sub-pixel (G), in the case where a crack occurs on the display panel 100, it may be observed that a significant voltage drop occurs in the second sub-pixel (G), causing it to emit light.

Meanwhile, when configuring the reference resistance generation circuit 522 as shown in FIG. 4 and determining each resistance value, the size of the display panel 100 may be taken into consideration.

In other words, the value of the resistance ($R_{pcd\_line}$) formed in the detection line 110 may vary depending on the size of the display panel 100.

Therefore, as mentioned earlier, the reference resistance values generated through the reference resistance generation circuit 522 should be sufficiently greater than the resistance value ($R_{pcd\_line}$) formed in the detection line 110.

To achieve this, as illustrated in FIG. 4, a 5-bit variable resistor, for instance, may be employed to appropriately accommodate variations in the resistance value ($R_{pcd\_line}$) formed in the detection line 110 due to different sizes of the display panel 100 or other factors.

This allows for the prevention of unintentional sub-pixel illumination, even when cracks do not occur on the display panel 100, but there is a significant voltage drop due to the resistance value ($R_{pcd\_line}$) formed in the detection line 110.

The present disclosure does not involve applying the VDD voltage to the detection line 110 for measuring the resistance value of the detection line to determine whether the display panel is cracked.

Instead, black data may be applied to the detection line to assess the status of the display panel 100 based on whether specific sub-pixels emit light due to voltage drops associated with cracks.

The PCD circuit 520 may not be necessary a circuit configuration for measuring the resistance value of the detection line 110, in an embodiment.

Figure 5:
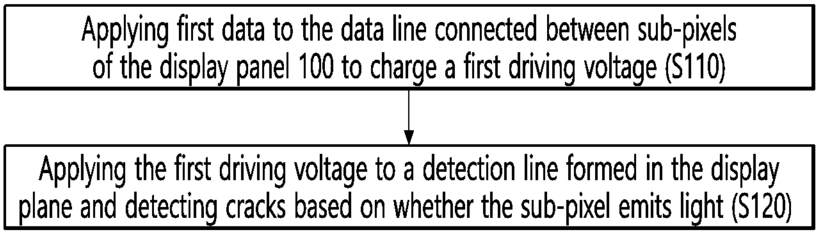
FIGS. 5 and 6 are flowcharts illustrating a method of measuring panel cracks in a display device.
Figure 6:
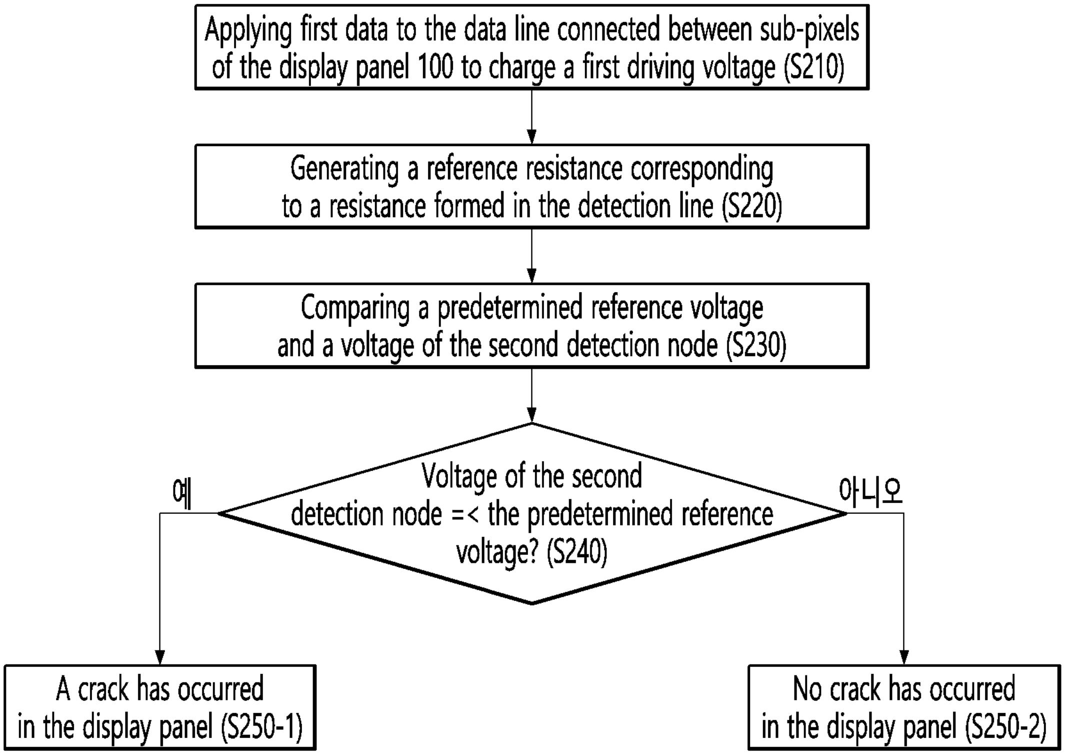

FIGS. 5 and 6 are flowcharts illustrating a method of measuring panel cracks in a display device.

Referring to FIG. 5, the method for measuring panel cracks may be carried out as below.

In S110, by applying first data to the data line connected between sub-pixels of the display panel 100, the data line may be charged with a first driving voltage.

In S120, the first driving voltage is re-applied to the detection line 110 formed in the display panel 100, and panel cracks may be detected based on whether the sub-pixel emits light.

Specifically, the controller (not shown) of the source driver IC 500 may control to pre-apply black data to the data line through a second driving voltage generator (Source AMP) included in the driving circuit 510 to charge for detecting panel cracks, and subsequently, the second driving voltage generator may be controlled to operate in Hi-Z.

Subsequently, the controller may control the switch 140 formed within the display panel 100 to be activated and the black driving voltage to be re-applied from the first driving voltage generator 521 to the data line that has already been charged.

At this time, the data lines of the first and third sub-pixels, which are linked to the first detection node 120, may be provided with the black driving voltage, while the data line of the second sub-pixel, connected to the second detection node 130, may be given a lower voltage than the black driving voltage.

At this moment, when the resistance of the detection line 110 exceeds a threshold, a voltage drop surpassing the threshold may be triggered, leading to the illumination of the second sub-pixel (G), as shown in FIG. 7, as described subsequently.

When the second sub-pixel (G) illuminates as such, the controller may detect the occurrence of a crack in the display panel 100.

Unlike in FIG. 5, the panel crack detection or determination method in FIG. 6 may be performed as below.

S210 is analogous to S110 as described in the aforementioned FIG. 5.

In S220, the reference resistance generation circuit 522 is capable of generating a reference resistance corresponding to the resistance ($R_{pcd\_line}$) formed in the detection line 110.

In S230, the comparator 523 is capable of comparing the voltage of the second detection node 130 with a predetermined reference voltage.

In S240, the controller may assess whether the voltage at the second detection node is lower than the reference voltage.

If, as determined in S240, the controller may detect that the voltage at the second detection node 130 is equal to or below the reference voltage, it is determined that a crack has occurred in the display panel 100 (S250-1).

Conversely, if the voltage at the second detection node 130 exceeds the reference voltage, it is determined that no crack has occurred in the display panel 100 (S250-1).

Specifically, the presence of a crack in the display panel 100 is determined by comparing the reference voltage $V_{REF}$ with the voltage at the second detection node 130.

At this point, the reference voltage $V_{REF}$ may be half of the voltage output from the first driving voltage generator 521, but is not necessarily limited to this, for example.

If the resistance of the detection line 110 exceeds the reference resistance, the controller may determine that a crack has occurred in the display panel 100, as the voltage on the second detection node 130 surpasses the reference voltage ($V_{REF}$). Conversely, in the opposite scenario, the controller may determine that no crack has occurred.

FIG. 7 illustrates an operation of the display panel 100 in the event of a crack occurring.

First, referring to (a) of FIG. 7, the operation of each sub-pixel will be described as follows.

Referring to the circuit in (a) of FIG. 7, the operation of the respective sub-pixel may vary based on the voltage ($V_{SG}$) of the capacitor formed between VDD and the data line.

For instance, a higher $V_{SG}$ may activate the TFT.

Consequently, when the TFT is activated and the switch (TFT sw) is closed, the corresponding sub-pixel emits light.

In (a) of FIG. 7, the black driving voltage supplied to the data line may be equal to or smaller than VDD.

In case that a black driving voltage is applied to the data line, $V_{SG}$ has a very small value not to activate the TFT.

However, in case a crack occurs in the display panel 100, the resistance of the detection line 110 may increase, leading to a voltage drop exceeding the threshold.

As a result, $V_{SG}$ may be applied at a value greater than the voltage when the black driving voltage may be applied to the data line.

The $V_{SG}$ value may ultimately activate the TFT.

Consequently, as the TFT activates, power is supplied to the light source of the corresponding sub-pixel, eventually causing it to emit light.

If the sub-pixel emits light in this manner, a crack has occurred in the display panel may be recognized.

(b) of FIG. 7 is a timing diagram illustrating the operation of a normal panel.

Referring to (b) of FIG. 7, a black driving voltage may be applied from the source to the data line.

Subsequently, the source may be controlled to operate in Hi-Z.

With the application of the black driving voltage by the source, there is no voltage drop occurring in the first and third data lines.

In other words, each sub-pixel connected to the first and third data lines, namely the first sub-pixel (R) and the third sub-pixel (B), does not emit light.

Furthermore, upon the application of the black driving voltage by the source, a voltage drop may occur on the second data line.

However, in this case, the voltage drop may be minimal. Here, a minimal voltage drop may suggest that there are no cracks in the display panel 100, resulting in a low detection line resistance value ($R_{pcd\_line}$) and subsequently a minor voltage drop.

Moreover, a minor voltage drop may indicate that it is insufficient to activate the TFT of the respective sub-pixel.

Hence, the sub-pixel may remain unlit as the TFT remains inactive.

Given that the second sub-pixel (G) does not emit light, it may be readily recognized that no cracks have occurred in the display panel 100.

On the contrary, (c) of FIG. 7 is a timing diagram illustrating the operation of an abnormal panel.

Here, the term 'abnormal panel' refers to a panel in which cracks have occurred.

As mentioned earlier, similar to (b) of FIG. 7, when a black driving voltage is applied to each data line by the source, no voltage drop may occur in the first and third data lines, so the TFT remains unactivated, and therefore, they do not emit light.

On the other hand, in the second data line, due to the crack, the resistance value of the detection line ($R_{pcd\_line}$) exceeds the threshold, leading to a greater voltage drop than what is observed in (b) of FIG. 7 due to the resistance value of the detection line ($R_{pcd\_line}$) exceeding the threshold.

This ultimately indicates that the voltage applied to the second data line decreases, and the value of $V_{SG}$ increases.

Therefore, when the value of $V_{SG}$ increases, the TFT may become activated.

Once the TFT is activated, and the switch (TFT sw) is turned on, the second sub-pixel (G) connected to the second data line emits light.

In other words, it becomes intuitively evident that a crack has occurred on the display panel 100.

Referring to (b) and (c) of FIG. 7, the black driving voltage applied from the source may be simultaneously applied to the first to third data lines, and then the detection switch (or PCD switch) 140 may be controlled.

When the detection switch 140 is controlled in this manner, as previously mentioned, no voltage drop may occur in the first and third data lines, while a voltage drop may occur in the second data line, as depicted.

However, unlike in (b) of FIG. 7, where in a normal panel, a voltage drop may occur in the second data line to the extent that the TFT is not activated, in (c) of FIG. 7, in an abnormal panel, the second data line may experience a voltage drop sufficient to activate the TFT.

Meanwhile, in the context above, controlling the detection switch 140 may imply turning off the first and third detection switches 141 and 143 while turning on the second detection switch 142.

As explained earlier, the first and third detection switches 141 and 143 either connect or disconnect between the first detection node 120 and the first and third data lines, and the second detection switch 142 either connects or disconnects between the second detection node and the second data line.

In connection with the present disclosure, it is possible to assess and identify the presence of panel cracks on a row and/or column basis, depending on the design of the detection lines (or PCD lines) in the display panel 100.

This ultimately signifies the capability to determine whether panel cracks exist within specific rows or columns.

Typically, when inspecting for cracks during product shipment, if cracks are detected in the same row or column units across multiple display panels 100, it may suggest a potential issue with the portion of the display panel manufacturing equipment corresponding to that particular row or column unit.

By making such assessments and providing guidance, it becomes possible to proactively prevent problems in additional panels.

Similarly, if a single display panel is, for instance, created by connecting multiple physical blocks, the present invention may also be applied on a per-physical-block basis.

FIGS. 8 to 11 illustrate various configurations for assessing the presence of cracks in a display panel.

For the sake of convenience, we will explain using an example where one display panel is formed by six physical blocks (1-6), but this is not intended to be limiting.

Figure 9:
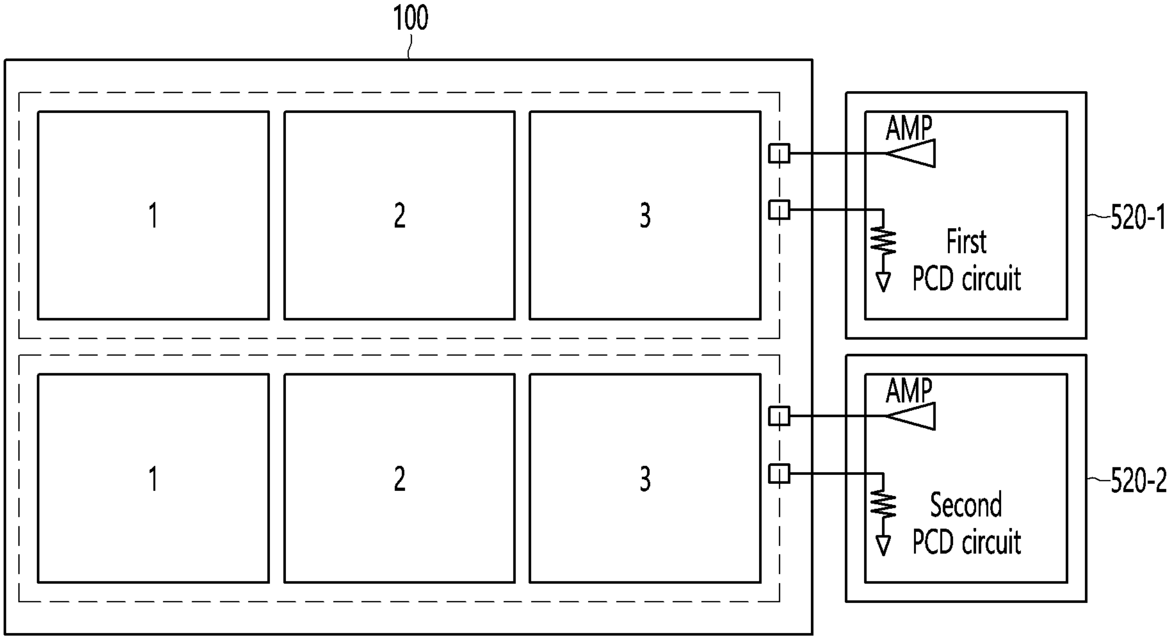
Figure 10:
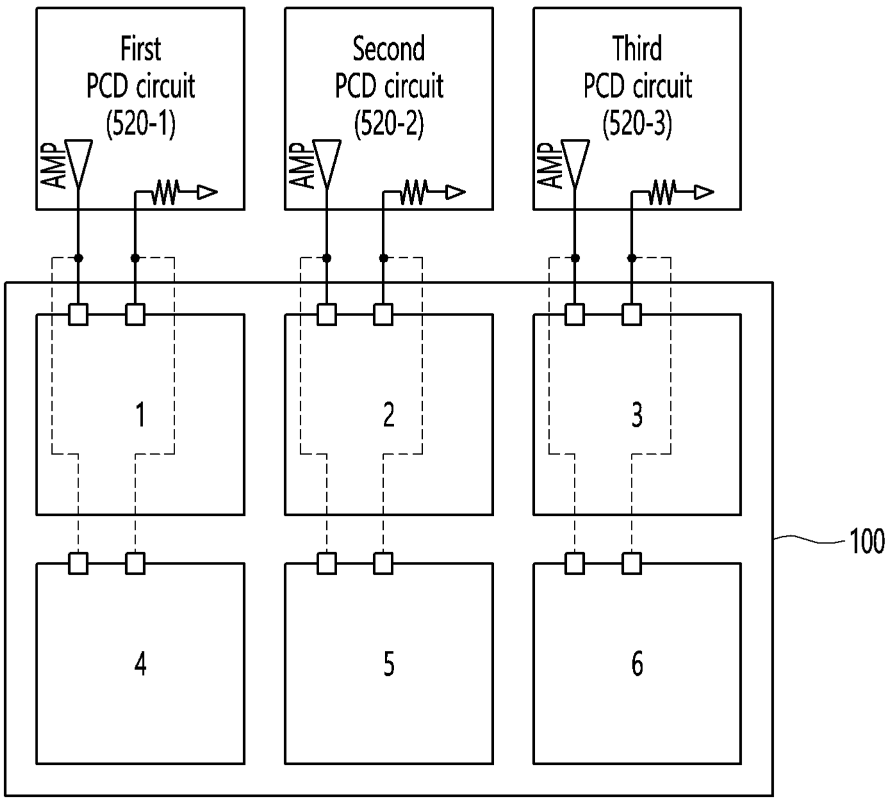
Figure 11:
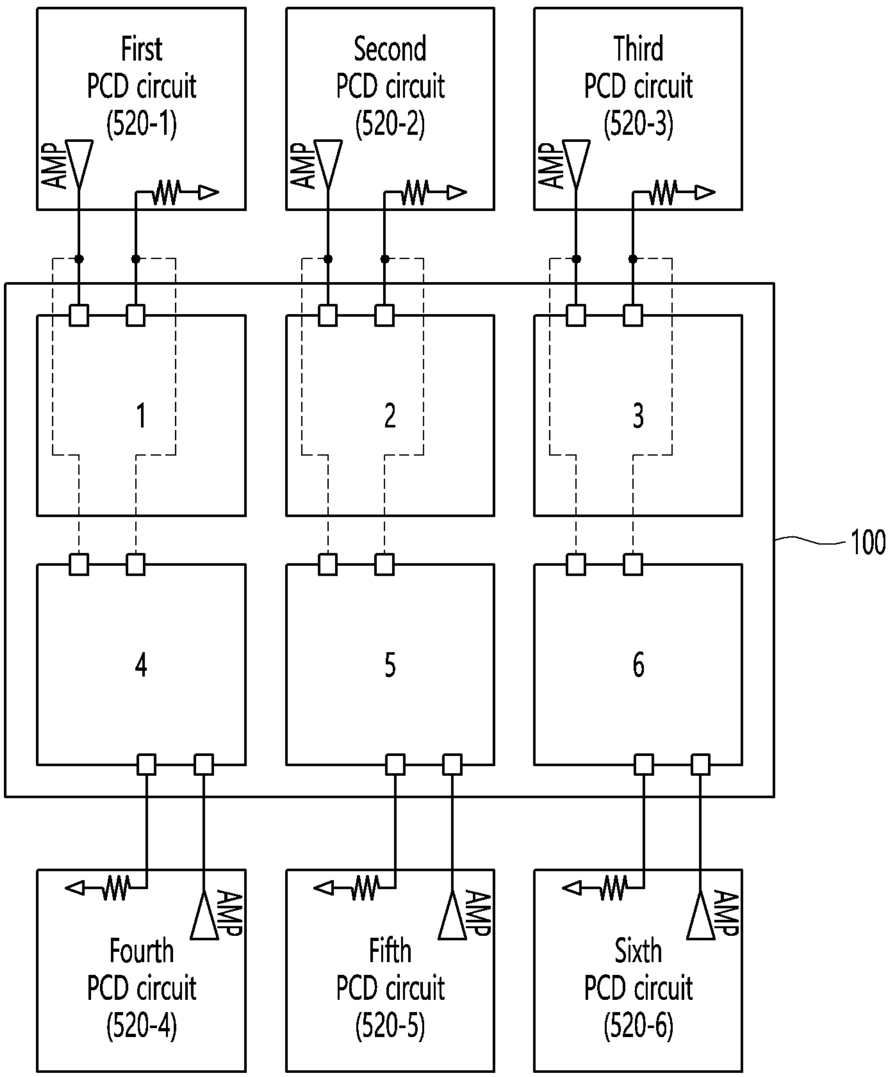

FIGS. 9 to 11, in particular, may be more useful for assessing the presence of cracks in large panels.

Figure 8:
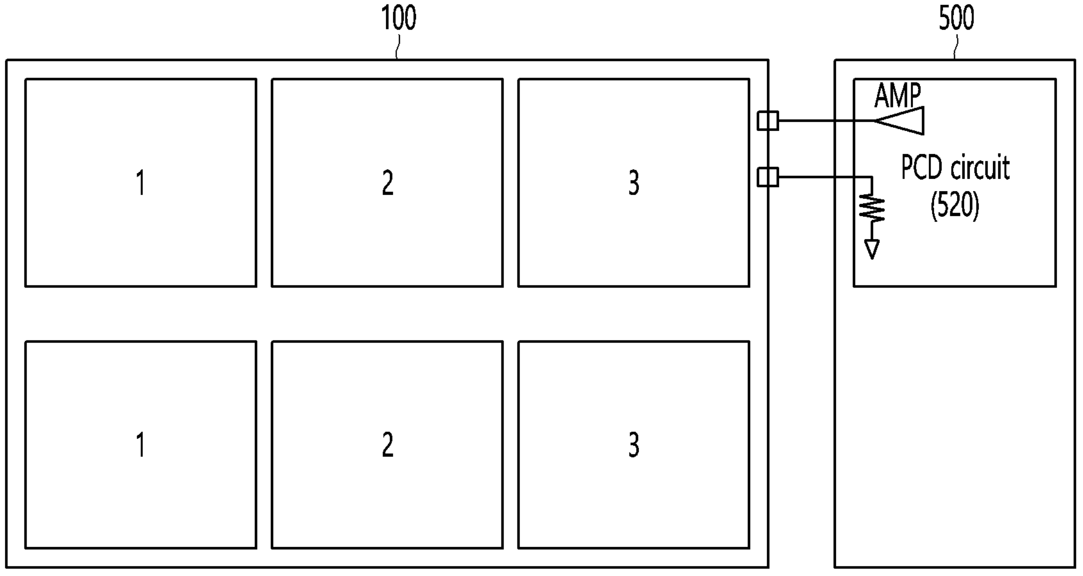
FIGS. 8 to 11 illustrate various configurations for assessing the presence of cracks in a display panel.

First, FIG. 8 illustrates an example of assessing the presence of cracks in all six physical blocks using a single PCD circuit included in the source driver IC 500, as described in FIGS. 1 to 5 above.

In FIG. 9, unlike FIG. 8, two PCD circuits are included in one source driver IC 500, and each PCD circuit (PCD1-PCD2) may detect and determine whether there are cracks in the panel on a row-by-row basis.

Specifically, the first PCD circuit may determine whether blocks 1 to 3 have cracks, and the second PCD circuit may determine whether blocks 4 to 6 have cracks.

In FIG. 10, unlike FIG. 8 or FIG. 9, a single source driver IC 500 includes three PCD circuits (PCD1-PCD3), and each PCD circuit may detect and determine panel cracks on a column-by-column basis.

Specifically, the first PCD circuit determines whether blocks 1 and 4 have cracks, the second PCD circuit determines whether blocks 2 and 5 have cracks, and the third PCD circuit determines whether blocks 3 and 6 have cracks.

In FIG. 11, unlike FIGS. 8 to 10, one source driver IC 500 includes six PCD circuits (PCD1-PCD6), and each PCD circuit is independently allocated to each block, allowing for the detection and determination of panel cracks in each respective block.

In FIGS. 9 to 11, the determination of whether the panel is cracked may be carried out independently or sequentially, either on a column-by-column basis, a row-by-row basis, or an individual block-by-block basis. In this scenario, if it is determined that a crack exists during the panel crack determination process, subsequent crack determination steps may be skipped. For instance, in FIG. 9, using the first PCD circuit to determine whether there is a panel crack in the first row, which comprises the first to third blocks, allows for the determination of panel cracks in the fourth to sixth blocks only if no cracks are found in the corresponding blocks. In other words, if cracks have already been detected in the first to third blocks, there may be no need to perform the operation to determine whether panel cracks exist in the fourth to sixth blocks. A similar approach may be applied in FIGS. 10 and 11 as well.

This allows for a more rapid and intuitive determination of whether the panel is cracked and the specific panel block where the crack has occurred, depending on the situation.

When using the PCD circuit configuration in FIGS. 9 to 11 to determine the presence of cracks, it offers the advantage of identifying whether a particular block is cracked. By collecting and aggregating this data, it becomes possible to pinpoint areas where cracks predominantly occur in equipment, thereby uncovering issues related to that specific line across the entire manufacturing line.

In FIGS. 9 to 11, each PCD circuit may be included in each source driver IC. Alternatively, a plurality of PCD circuits may be included in one source driver IC. Alternatively, at least one of the plurality of PCD circuits may be formed in another component of the display device 1000 other than the source driver IC, or may be formed in a separate IC.

What is claimed is:

1. A source driver comprising:

a first circuit configured to apply first data to data lines connected to a plurality of sub-pixels of a display panel to charge a first driving voltage; and a second circuit configured to apply the first driving voltage to a detection line on the display panel to detect one or more cracks in the display panel based on the illumination status of the plurality of sub-pixels, wherein the detection line includes a first detection node and a second detection node on one side of the display panel, wherein the first detection node is connected to data lines connected to first and third sub-pixels, wherein the second detection node is connected to a data line connected to a second sub-pixel, and wherein the second circuit further comprises a third circuit configured to generate a reference resistance in relation to a resistance in the detection line.

2. The source driver of claim 1, wherein the second circuit further comprises a driving voltage generator configured to apply the first driving voltage to the detection line through the first detection node.

3. The source driver of claim 2, wherein the second circuit is configured to compare a predetermined reference voltage with a voltage of the second detection node to detect one or more cracks in the display panel.

4. The source driver of claim 1, wherein the first driving voltage applied by the second circuit is supplied to the data lines connected to the plurality of sub-pixels through switches disposed between the first and second detection nodes included in the detection line and the data lines connected to the plurality of sub-pixels.

5. The source driver of claim 1, wherein the reference resistance is configured to prevent each sub-pixel from emitting light based on a voltage drop caused by the resistance in the detection line.

6. The source driver of claim 1, wherein the first data comprises black data.

7. The source driver of claim 1, wherein, when the data lines connected to the plurality of sub-pixels are charged with the first driving voltage by applying the first data to the data lines connected to the plurality of sub-pixels, the first circuit is configured to operate in a Hi-Z state.

8. A display device of detecting one or more cracks of a display panel, the display device comprising:

the display panel; and a driver IC configured to detect one or more cracks in the display panel, wherein the driver IC includes:

a first circuit configured to apply first data to data lines connected to a plurality of sub-pixels of the display panel to charge a first driving voltage; and a second circuit configured to apply the first driving voltage to a detection line on the display panel to detect one or more cracks in the display panel based on the illumination status of the plurality of sub-pixels, wherein the detection line includes a first detection node and a second detection node on one side of the display panel along, wherein the first detection node is connected to data lines connected to first and third sub-pixels, wherein the second detection node is connected to a data line connected to a second sub-pixel, and wherein the second circuit further comprises a third circuit configured to generate a reference resistance in relation to a resistance in the detection line.

9. The display device of claim 8, wherein the second circuit further comprises a driving voltage generator configured to apply the first driving voltage to the detection line through the first detection nodes.

10. The display device of claim 9, wherein the first driving voltage applied by the second circuit is supplied to the data lines connected to the plurality of sub-pixels through switches disposed between the first and second detection nodes included in the detection line and the data lines connected to the plurality of sub-pixels.

11. The display device of claim 9, wherein the second circuit is configured to compare a predetermined reference voltage with a voltage of the second detection node to detect one or more cracks in the display panel.

12. The display device of claim 8, wherein the first driving voltage applied by the second circuit is supplied to the data lines connected to the plurality of subpixels through switches disposed between the first and second detection nodes included in the detection line and the data lines connected to the plurality of sub-pixels.

13. The display device of claim 8, wherein the first data comprises black data.

14. The display device of claim 8, wherein, when the data lines connected to the plurality of sub-pixels are charged with the first driving voltage by applying the first data to the data lines connected to the plurality of sub-pixels, the first circuit is configured to operate in a Hi-Z state.

15. A method of detecting one or more panel cracks in a display device, the display device comprising a display panel, the method comprising:

applying first data to data lines connected with a plurality of sub-pixels of the display panel to charge a first driving voltage; and applying the first driving voltage to a detection line formed in the display panel to detect one or more cracks in the display panel based on the illumination status of the plurality of sub-pixels, wherein the detection line includes a first detection node and a second detection node formed on one side of the display panel, wherein the first detection node is connected to data lines connected to first and third sub-pixels, wherein the second detection node is connected to a data line connected to a second sub-pixel, and wherein the method further comprises generating a reference resistance in relation to a resistance formed in the detection line.

16. The method of claim 15, wherein the first driving voltage is applied to the detection line through the first detection node.

17. The method of claim 16, further comprising:

comparing a preset reference voltage with a voltage of the second detection node to detect one or more cracks in the display panel.

18. The method of claim 15, wherein the first driving voltage is supplied to the data lines connected to the plurality of sub-pixels via switches formed between the first and second detection nodes included in the detection line and the data lines connected to the plurality of sub-pixels.

19. The method of claim 15, wherein the reference resistance is configured to prevent each sub-pixel from emitting light based on a voltage drop caused by the resistance formed in the detection line.

20. The method of claim 15, wherein the first data includes black data, and wherein, when the data lines connected to the plurality of sub-pixels are charged with the first driving voltage by applying the first data to the data lines connected to the plurality of sub-pixels, the first circuit is configured to operate in a Hi-Z state.

* * * * *